United States Patent [19]

Druais et al.

[11] Patent Number: 4,478,030
[45] Date of Patent: Oct. 23, 1984

[54] MACHINE FOR CUTTING FORAGE PLANTS

[75] Inventors: Robert E. J. Druais, La Roche/S/Yon; Damien M. M. Barbeau, Coex, both of France

[73] Assignee: Hesston Corporation, Hesston, Kans.

[21] Appl. No.: 301,723

[22] Filed: Sep. 14, 1981

[30] Foreign Application Priority Data

Oct. 20, 1980 [FR] France .............................. 80 22398

[51] Int. Cl.$^3$ ............................................ A01D 45/02
[52] U.S. Cl. ........................................ 56/60; 56/13.9; 241/220; 241/221
[58] Field of Search .................... 56/13.4, 13.9, 16, 60; 241/222, 221, 101.7

[56] References Cited

U.S. PATENT DOCUMENTS

| 546,565 | 9/1895 | Turner | 241/222 |
|---|---|---|---|
| 1,351,287 | 8/1920 | Devey | 56/255 |
| 1,731,956 | 10/1929 | Wagner | 241/101.7 |
| 1,735,226 | 11/1929 | Whitney et al. | 241/101.7 |
| 2,477,795 | 8/1949 | Gehl | 241/101.7 |
| 2,886,331 | 5/1959 | Simpson | 241/222 |
| 2,929,190 | 3/1960 | Woody | 56/249 |
| 3,195,595 | 7/1965 | Corwith et al. | 241/101.7 |

Primary Examiner—Gene Mancene
Assistant Examiner—James Hakomaki
Attorney, Agent, or Firm—Schmidt, Johnson, Hovey & Williams

[57] ABSTRACT

The cutting cylinder of a forage harvester is provided with a plurality of fragmenting bars interspersed between the circumferentially spaced apart knives of the cylinder. Each of the fragmenting bars has a generally radially outwardly projecting portion that terminates in an outermost, serrated margin located inwardly adjacent the extremity of the cylinder as defined by the cutting edges of the knives during rotation thereof. Such serrations of the bars present rasping teeth that abraid, fracture and fragment crop cuttings produced by the knives so as to provide more uniformly sized, finer crop fragments and cracked kernels for the production of high quality silage.

4 Claims, 8 Drawing Figures

U.S. Patent  Oct. 23, 1984  4,478,030
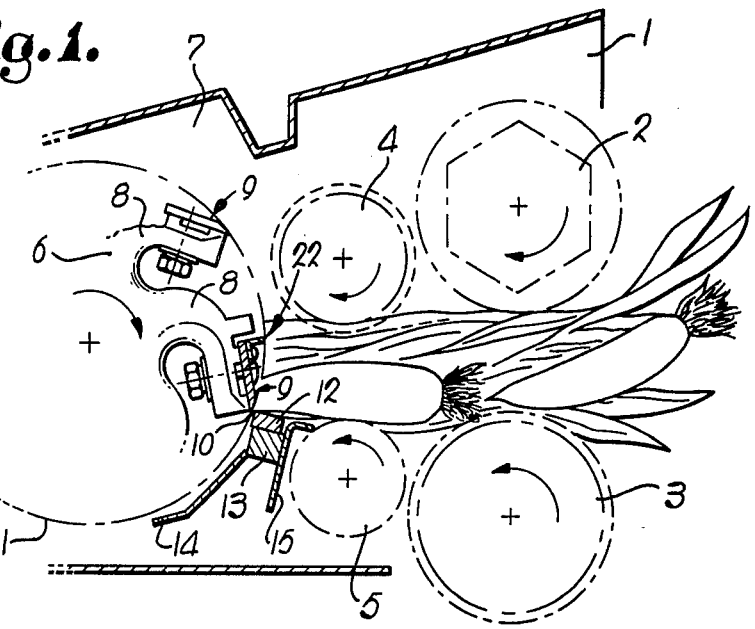
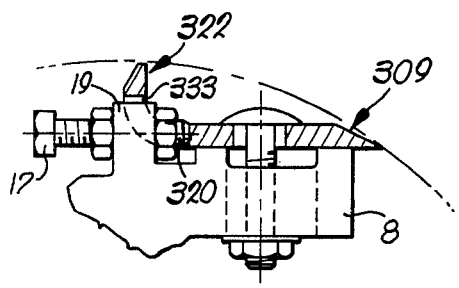
Fig.3.
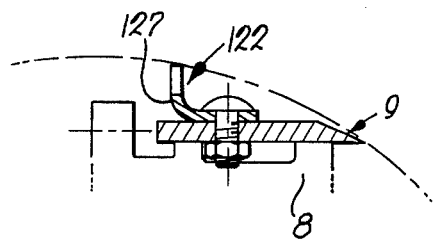
Fig.4.
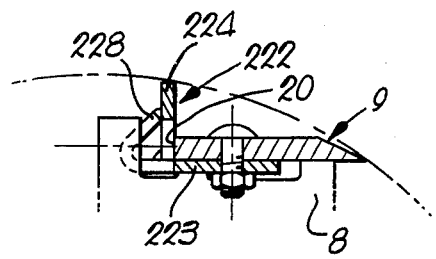
Fig.5.
Fig.6.
Fig.7.
Fig.8.

MACHINE FOR CUTTING FORAGE PLANTS

TECHNICAL FIELD

The present invention relates to a harvesting and chopping machine for forage plants, such as corn, for use in preparing silage from the corn plants.

BACKGROUND ART

Currently available forage harvesters frequently fail to adequately chop corn plants into small pieces of uniform size, and often leave kernels from the corn plants wholly uncracked. Large fragments of stems, leaves and cobs as well as whole, uncracked kernels cause poor fermentation in silos and results in livestock silage of poor quality.

SUMMARY OF THE PRESENT INVENTION

An aim of the present invention is to eliminate these drawbacks by supplying an improved chopping machine by which fragments of stems, leaves and cobs are much smaller and more uniformly sized than those heretofore obtained, and with the majority of corn kernels thoroughly cracked.

In accordance with the present invention, the cutting cylinder has a series of fragmenting bars that are interspersed between the knife edges presented by the cylinder, such bars having radially outwardly projecting portions that terminate in serrated margins adjacent the cylindrical boundary defined by the cutting edges of the knives during rotation of the cutter. The knives are themselves helically configured, and the bars are likewise helically disposed so as to each run generally parallel to its associated knife along the length of the cylinder.

BRIEF DESCRIPTION OF THE DRAWINGS

FIG. 1 is a schematic elevational view, with parts shown in cross section for clarity, of a cutting cylinder and associated housing and feedroll mechanism, all employing the fragmenting bars of the present invention;

FIG. 2 is a fragmentary, front perspective view of the cutting cylinder;

FIG. 3 is an enlarged, fragmentary, transverse cross-sectional view of one mount of the cylinder and its associated knife, together with a second form of fragmenting bar;

FIG. 4 is a transverse cross-sectional view similar to FIG. 3 of a third form of fragmenting bar;

FIG. 5 is a transverse cross-sectional view similar to FIGS. 3 and 4 of a fourth form of fragmenting bar; and FIGS. 6, 7 and 8 are fragmentary, plan views of the outer margins of fragmenting bars illustrating a variety of configurations for the rasping teeth thereof.

DETAILED DESCRIPTION

With initial reference to FIG. 1, it may be seen that the machine of the present invention includes a feeding chamber 1 within which is associated a pair of superimposed feedrolls 2 and 3, as well as an additional set of superimposed feedrolls 4 and 5 located immediately downstream from the feedrolls 2 and 3 with respect to the direction of flow of crop material within the feeding chamber 1. Whole corn plants, including stalks, leaves and cobs with kernels attached, are fed by the rolls 2, 3, 4 and 5 from the feeding chamber 1 toward and into the rotary cutting cylinder 6 housed within the cutting chamber 7. The cutting cylinder 6 rotates about an axis that is transverse to the direction of feed of the plant materials by the rolls 2, 3, 4 and 5 so as to sever the plant materials into countless small lengths, the size of which depends at least in part on the rate of feed of such materials by rolls 2, 3, 4 and 5 relative to the speed of rotation of the cutting cylinder 6.

The cylinder 6 includes, among other things, three separate supporting bulkheads spaced along the axis of rotation of the cylinder 6, each of which has a plurality of circumferentially spaced apart, knife-supporting arms 8. At the outer ends of the arms 8 are located helical knives 9 having outermost cutting edges 10 which define and describe the cylindrical outermost extremity of the cutting cylinder 6 when the latter is rotated, such extremity being indicated by the numeral 11 in FIGS. 1 and 2.

The machine also includes a shearbar 12 supported by a block 13 and with which the knives 9 cooperate to severe the incoming plant materials into countless cuttings as above noted. An apron 14 or the like wraps partially beneath the cylinder 6 to assist in guiding severed materials on around the cylinder after severance, and a scraper 15 is positioned next adjacent to the feedroll 5 for keeping the latter clean and for assisting in supporting the plants as they enter the cutting cylinder 7.

Each of the knives 9 is secured onto its corresponding three arms 8 along the length of the cylinder 6 by suitable fasteners such as round-headed bolts 16. When the bolts are loose, the position of the cutting edge 10 with respect to the shearbar 12 can be adjusted through the provision of adjusting screws 17 located behind the body 18 of each knife 9. Each adjusting screw 17 passes through a drilled-and-tapped ear 19 on the arm 8 with the leading end of each screw 17 being in abutment with the heel 20 of the corresponding knife body 18.

It will be noted that as a result of the helical configuration of each of the knives 9, the leading or forwardmost end 10a of each cutting edge 10 has already reached the shearbar 12 during each revolution prior to the trailing, opposite end of each cutting edge 10b reaching the shearbar 12. This results in a very satisfactory shearing-type cut as opposed to a blunt chop.

In accordance with the present invention, a series of fragmenting bars 22 are interspersed between the cutting edges 10 around the cylinder 6. Each of the bars 22 is generally L-shaped, presenting a leg 23 and a leg 24, the latter leg defining a radially outwardly projecting, crop-engaging portion of the bar 22 terminating in an outermost, serrated margin that presents rasping teeth 25. If desired, the leg 24 can be inclined forwardly with respect to the direction of rotation of the cylinder 6, although a purely radial orientation is preferred. Preferably, each of the bars 22 is attached directly to a corresponding knife 9 via a series of bolts 26 passing through the leg 23 and into and through the body 18 of the knife 9. The embodiment of the bar 22 illustrated in FIG. 2 has the legs 23 and 24 thereof intersecting at right angles to present a square corner. If desired, however, they may be maintained at right angles to one another, yet be interconnected by a rounded stretch such as the stretch 127 on the bar 122 in FIG. 4.

In another form as shown in FIG. 5, the bar 222 may be fabricated from two parts as opposed to being an integral, L-shaped member as in the embodiments of FIGS. 2 and 3. The bar 222 may have its leg 223 provided with a rearwardly disposed, upturned section 228 which backs up and provides support for the radial leg portion 224 resting at its lower end upon the portion 223. In this arrangement, the knife 9 rests on top of the leg 223 with heel 20 of the knife 9 abutting the radial leg 224. Leg 224 is welded at its radially inner end to the leg 223 and is likewise welded adjacent its outer end to the upturned portion 228.

It will be recognized that the embodiments illustrated in FIGS. 1-5 are adapted for removable attachment to the respective knives 9. On the other hand, however, it is within the scope of the present invention to have the fragmenting bars integrally associated with the knives as illustrated, for example, by the embodiment of FIG. 3 wherein the bar 322 curves rearwardly and outwardly from the heel 320 of the knife 309 and is integral therewith. Suitable clearance is provided in the integral knife-bar assembly for the adjusting screw 17 in order that the latter can operate against the heel 20 in the intended manner for adjustment purposes. Such clearance may be provided by an opening 333 in the upturned bar 322.

It will be noted from FIGS. 6, 7 and 8 that the teeth 25 of the bar 22, as well as the corresponding teeth of the other embodiments herein described, may assume a variety of shapes. For example, they may be triangular, trapezoidal, square or rounded off. Additionally, they may be a combination of the above as shown in FIGS. 6-8.

It is also to be recognized that a fragmenting bar may be provided for each of the knives 9, or only selected ones of such knives. Furthermore, the bars may be constructed in the form of short segments as opposed to corresponding in overall length to the knives 9 as illustrated in FIG. 2 in which case the segments may be adjustably positioned along the knives in the most desirable manner.

During operation and use of the chopping machine, and using the bar 22 as an example, the teeth 25 thereof pass through the severed plant material in an abraiding, rasping and impacting action. Consequently, the leaves of the corn plant, for example, are torn while the stalks and cobs are thoroughly crushed and broken. The kernels themselves are advantageously cracked open, all of which produces smaller crop fragments of more uniform size to promote proper fermentation for silage purposes.

We claim:

1. In a forage harvester having a rotary crop cutter and apparatus for feeding crop materials into the cutter at a predetermined rate of speed relative to the rotational speed of the cutter whereby to sever the materials into small fragments of predictable length, the improvement comprising:

a plurality of circumferentially spaced knives having outermost cutting edges that describe a cylindrical extremity of the cutter during rotation thereof; and a plurality of fragmenting bars, one bar for each of said knives, interspersed between said cutting edges of the knives and each having a generally radially outwardly projecting, crop-engaging portion terminating in an outermost serrated margin located inwardly adjacent said cylindrical extremity and presenting a series of rasping teeth, each of said margins having blunt, leading crop-impacting surfaces for fracturing crop materials by impact blows as the materials are projected into the cutter by said feeding apparatus, said feeding apparatus including structure separate from said cutter and fragmenting bars and spaced forwardly of said crop cutter in the direction of travel of said harvester, for engaging and gripping said materials during cutting and fragmenting thereof by said cutter and fragmenting bars respectively.

2. In a forage harvester as claimed in claim 1, wherein said crop-engaging portion of each bar is inclined forwardly with respect to the direction of rotation of the cutter.

3. In a forage harvester as claimed in claim 1, wherein each of said bars is an integral part of a corresponding one of said knives.

4. In a forage harvester as claimed in claim 1, wherein each of said bars is releasably attached to a corresponding one of said knives.

* * * * *